(12) United States Patent
Molinelli et al.

(10) Patent No.: US 11,827,345 B2
(45) Date of Patent: Nov. 28, 2023

(54) TAIL ROTOR ACTUATOR JOINT

(71) Applicant: Microtecnica S.r.l., Turin (IT)

(72) Inventors: Dario Molinelli, Carnate (IT); Michele Restuccia, Milan (IT); Franco Maino, Brugherio (IT)

(73) Assignee: MICROTECNICA S.R.L., Turin (IT)

( * ) Notice: Subject to any disclaimer, the term of this patent is extended or adjusted under 35 U.S.C. 154(b) by 61 days.

(21) Appl. No.: 17/539,415

(22) Filed: Dec. 1, 2021

(65) Prior Publication Data
US 2022/0194574 A1 Jun. 23, 2022

(30) Foreign Application Priority Data
Dec. 18, 2020 (EP) .................................... 20215761

(51) Int. Cl.
*B64C 27/78* (2006.01)
*B64C 27/605* (2006.01)
*B64C 27/82* (2006.01)

(52) U.S. Cl.
CPC ............ *B64C 27/78* (2013.01); *B64C 27/605* (2013.01); *B64C 27/82* (2013.01)

(58) Field of Classification Search
CPC ....... B64C 27/78; B64C 27/605; B64C 11/30; F16B 21/16
See application file for complete search history.

(56) References Cited

U.S. PATENT DOCUMENTS

| | | |
|---|---|---|
| 2,647,807 A | 8/1953 | Brunstrum |
| 5,297,934 A | 3/1994 | Desjardins |
| 5,486,079 A * | 1/1996 | Martin ................ F16B 19/1063 411/361 |
| 5,588,788 A * | 12/1996 | Dominguez ........... H02G 3/121 411/923 |
| 6,203,277 B1 | 3/2001 | Legendre et al. |
| 6,568,854 B2 | 5/2003 | Schleinitz |
| 10,745,122 B2 | 8/2020 | Mullen et al. |
| 2003/0202861 A1* | 10/2003 | Nelson .................. F16B 35/041 411/487 |
| 2004/0046389 A1* | 3/2004 | Smith ..................... F16L 21/08 285/337 |

(Continued)

FOREIGN PATENT DOCUMENTS

| | | |
|---|---|---|
| CN | 111891369 A | 11/2020 |
| DE | 240089 A1 | 10/1986 |

(Continued)

OTHER PUBLICATIONS

European Search Report for Application No. 20215761.6, dated May 27, 2021, 10 Pages.

*Primary Examiner* — Joshua J Michener
*Assistant Examiner* — Cindi M Curry
(74) *Attorney, Agent, or Firm* — CANTOR COLBURN LLP (57) ABSTRACT

A joint for an actuator of a rotorcraft includes a housing configured to be coupled to an input lever of the actuator; and a rotary bearing coupled to the housing, the rotary bearing comprising an inner race and an outer race and configured to be coupled to a control rod, wherein the inner race and outer race are rotationally fixed relative to each other until a torque applied to the joint exceeds a threshold torque value, upon which there is a relative rotatability between the inner race and the outer race.

11 Claims, 8 Drawing Sheets

(56) References Cited

U.S. PATENT DOCUMENTS

| | | | | |
|---|---|---|---|---|
| 2010/0232872 A1* | 9/2010 | Kato | ................. | E04B 1/2604 |
| | | | | 403/306 |
| 2018/0306231 A1* | 10/2018 | Bier | ................. | F16B 31/021 |
| 2019/0359316 A1 | 11/2019 | Bekircan et al. | | |
| 2020/0217346 A1* | 7/2020 | Clark | ................. | F16B 21/16 |
| 2021/0270133 A1* | 9/2021 | Abreu | ................ | E21D 21/008 |
| 2022/0034353 A1* | 2/2022 | Champa | ................ | B29C 70/42 |

FOREIGN PATENT DOCUMENTS

| | | | |
|---|---|---|---|
| DE | 102013207783 A1 | 10/2014 | |
| EP | 1731421 B1 | 8/2008 | |
| GB | 2148819 A | 6/1985 | |

\* cited by examiner

TAIL ROTOR ACTUATOR JOINT

CROSS-REFERENCE TO RELATED APPLICATIONS

This application claims priority to European Patent Application No. 20215761.6 filed Dec. 18, 2020, the entire contents of which is incorporated herein by reference.

TECHNICAL FIELD

This disclosure relates to a joint for an actuator of a rotorcraft. This disclosure also relates to an actuator for a rotorcraft, and a rotorcraft, such as a helicopter, comprising a tail rotor and an actuator.

BACKGROUND

Rotorcraft, such as helicopters, often use a tail rotor in cooperation with a main rotor to help control the direction of flight (yaw control). The main rotor produces the vertical lift, and the tail rotor produces horizontal thrust to counteract the torque produced by rotation of the main rotor.

The amount of thrust produced by the tail rotor typically depends on the pitch angle of the tail rotor blades. The pitch angle may be controlled by an actuator that provides linear movement to a pitch control rod. One end of the pitch control rod is coupled to the actuator by a joint, such as the conventional joint shown in FIG. 1. The other end of the pitch control rod is coupled to the tail rotor by a duplex bearing, as shown in FIG. 2.

The tail rotor actuator is a safety-critical feature because it provides control over the yaw angle of the rotorcraft and failure of the actuator may result in a catastrophic failure of the rotorcraft.

The tail rotor actuator is designed to carry axial and bending loads and, in normal operation, experiences a low level of torque from the tail rotor. If the duplex bearing seizes up or otherwise fails, for example due to contamination of the duplex bearing, an increase in friction at the bearing may cause a high amount of torque to be transferred from the tail rotor, along the pitch control rod to the actuator. This torque transfer can cause the actuator to break such that the connection to the pitch control rod is lost. This situation may be a critical failure because the pilot no longer has control of the tail rotor blade pitch angle and cannot control the anti-torque effect of the tail rotor or the yaw angle of the rotorcraft.

Once the duplex bearing fails, the torque transferred to the actuator will begin to increase to a point at which a pilot alert may be issued before the tail rotor actuator has failed. The pilot may then decide to try to make an emergency landing before the actuator fails and yaw control is lost. However, the time available for making an emergency landing is limited by the actuator's strength and ability to withstand the transferred torque without breaking. Conventional tail rotor actuators have joints between the pitch control rod and input lever that are rotationally fixed and only allow linear movement.

Figure 1:
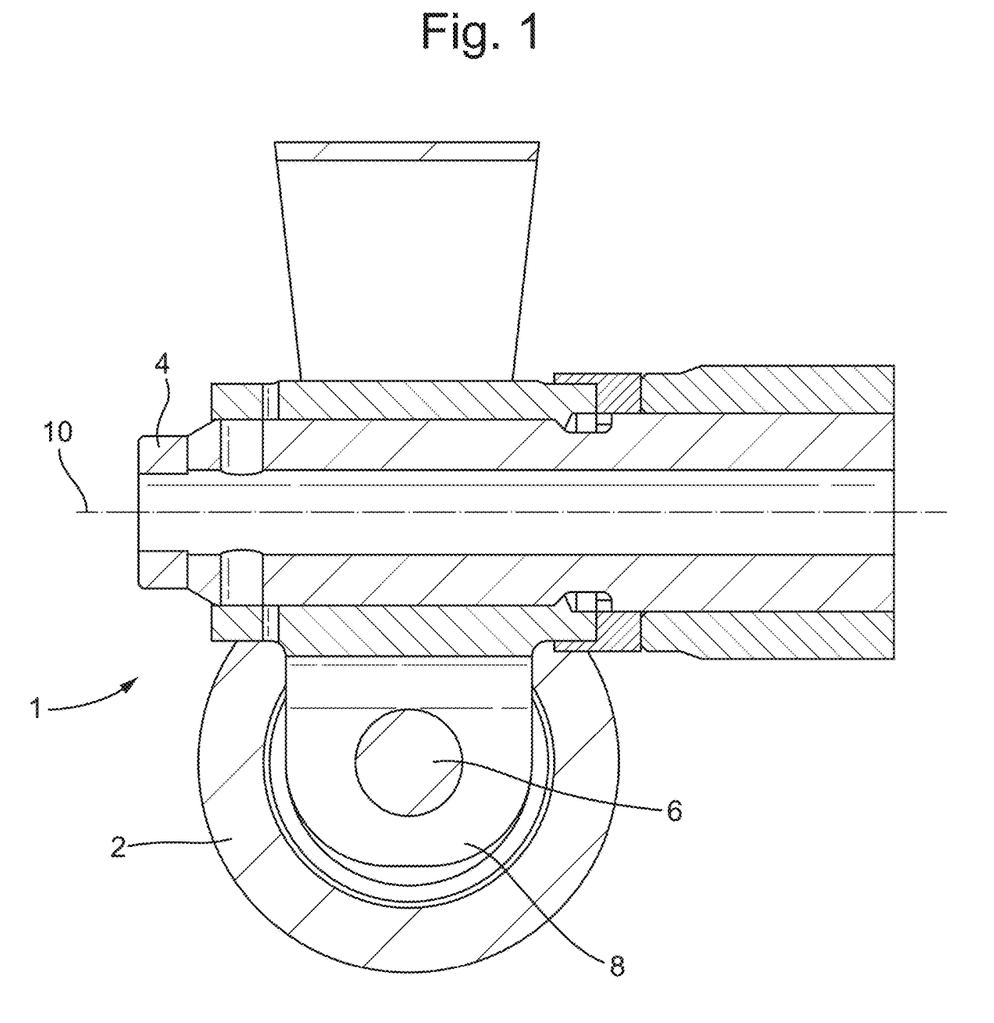
FIG. 1 shows a conventional joint for a tail rotor actuator.
Figure 2:
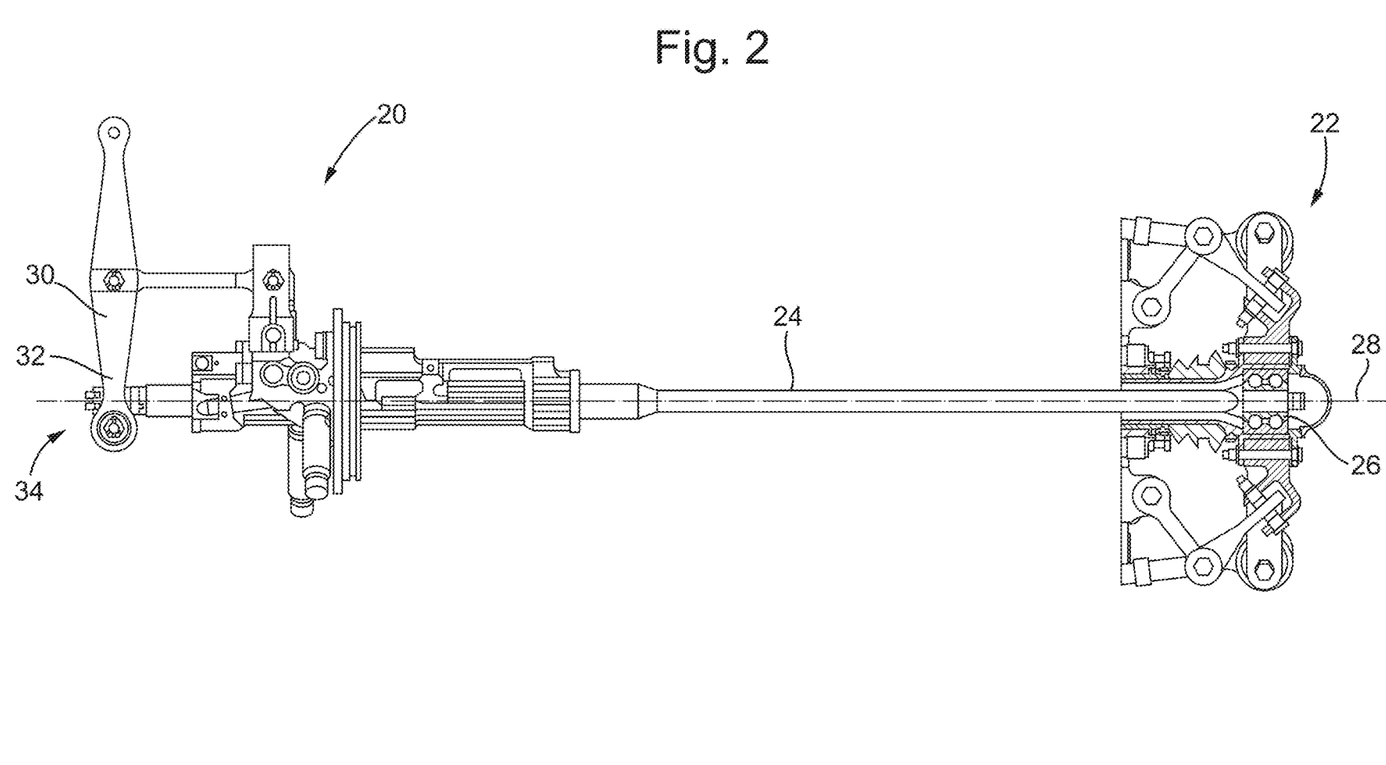
FIG. 2 shows an assembly comprising a tail rotor actuator in accordance with an embodiment of the present disclosure.

A conventional joint 1 for a tail rotor actuator is shown in FIG. 1. An input lever 2 is coupled to a pitch control rod 4 via a trunnion 8 (and at a pivot point 6). The input lever 2 can be rotated by an operator, which causes it to pivot about the pivot point 6, leading to linear movement of the rod 4 in the direction of the axis 10. The rod 4 is fixed to the trunnion 8 such that it cannot rotate about the axis 10. Accordingly, if rod 4 transfers too much torque to the joint 1, the trunnion 8 may break such that the connection between the input lever 2 and rod 4 is severed. These types of joints may break relatively quickly under increased torque and may not provide the pilot with sufficient time to make an emergency landing.

Accordingly, a need exists to improve the durability of the actuators employed in rotorcraft tail rotors to increase the time available for an emergency landing when there is an undesirable increase in torque transferred from the tail rotor to the actuator.

SUMMARY

An aspect of the present disclosure provides a joint for an actuator of a rotorcraft, the joint comprising a housing configured to be coupled to an input lever of the actuator; and a rotary bearing coupled to the housing, the rotary bearing comprising an inner race and an outer race and configured to be coupled to a control rod (e.g., a blade pitch control rod), wherein the inner race and outer race are rotationally fixed relative to each other until a torque applied to the joint exceeds a threshold torque value, upon which there is a relative rotatability between the inner race and the outer race.

The joint may further comprise at least one shearing element coupled to the rotary bearing to rotationally fix the inner race and outer race relative to each other. The at least one shearing element may be configured to break when a torque applied to the joint (e.g., via the control rod) exceeds the threshold torque value such that upon which there is a relative rotatability between the inner race and the outer race.

The at least one shearing element may be a shear pin comprising a narrowed waist. The shear pin may be configured to break at the narrowed waist when a torque applied to the joint exceeds the threshold torque value.

The at least one shearing element may extend through the inner race, the outer race and the housing, and may be configured to break in an area located between the inner race and the outer race.

The outer race may be coupled to the housing, the inner race may be configured to be coupled to a control rod, and the relative rotatability between the inner race and the outer race may be provided by the inner race being rotatable with respect to the outer race.

The joint may further comprise a fastening system for fastening the joint to a control rod.

Another aspect of the present disclosure provides an actuator for a rotorcraft comprising the joint, and a control rod for a tail rotor and coupled to the joint such that a torque applied to the control rod is transferred to the joint, the control rod rotationally fixed relative to the joint until the torque applied to the joint via the control rod exceeds a threshold torque value, wherein, when the torque applied to the joint via the control rod exceeds a threshold torque value, the control rod becomes rotatable with the inner race and/or outer race due to their relative rotatability as aforesaid.

The at least one shearing element may couple the housing to the rotary bearing and the control rod. The at least one shearing element (e.g., a shear pin) may extend through a through-hole in the bearing and the housing. An end of the at least one shearing element may be received within a hole, such as a blind hole, in the control rod. If there are a plurality of shearing elements, each shearing element may extend through or be received within separate holes in the bearing, housing and/or control rod.

The joint may be fastened to the control rod by a fastening system. The fastening system may comprise a first nut and a second nut, and axial movement of the housing and outer race with respect to a longitudinal axis of the control rod may be restrained by the second nut, and axial movement of the inner race may be restrained by the first nut.

When a torque applied to the joint exceeds a threshold torque value, the inner race and the first nut may be rotatable relative to the outer race, housing and the second nut.

The actuator may further comprise an input lever coupled to the housing for applying a force to the control rod via the housing, causing linear movement of the control rod. The input lever may be pivotably coupled to the housing.

Another aspect of the present disclosure provides a rotorcraft comprising a tail rotor and the actuator, wherein the control rod is coupled to the tail rotor and configured to control a blade pitch of the tail rotor.

Another aspect of the present disclosure provides a method of operating a tail rotor of a rotorcraft, wherein the tail rotor is coupled to a first end of a control rod, and a second end of the control rod is coupled by a joint to an input lever, the joint comprising a housing coupled to the input lever and a rotary bearing coupled between the housing and the control rod, the method comprising: receiving a torque at the joint, the torque transferred from the tail rotor to the joint by the control rod; maintaining the housing, rotary bearing and control rod rotationally fixed relative to a longitudinal axis through the control rod while the torque received at the joint remains below a threshold value; once the torque received at the joint exceeds the threshold value, allowing the control rod and an inner race of the rotary bearing to rotate about the longitudinal axis relative to the housing and an outer race of the rotary bearing such that the torque transferred to the housing decreases below the threshold value.

The housing, rotary bearing and control rod may be maintained rotationally fixed relative to the longitudinal axis by at least one shearing element that is configured to break once the torque received at the joint exceeds the threshold value, so as to allow the control rod and the inner race of the rotary bearing to rotate about the longitudinal axis.

BRIEF DESCRIPTION OF DRAWINGS

One or more non-limiting examples will now be described, by way of example only, and with reference to the accompanying figures in which.

DETAILED DESCRIPTION

Referring to FIG. 2, an actuator 20 for a tail rotor 22 is shown in accordance with an embodiment of the present disclosure. The actuator 20 is shown coupled to a tail rotor 22 of a rotorcraft (not shown), such as a helicopter, via a pitch control rod 24. The pitch control rod 24 is coupled to the tail rotor 22 by a duplex bearing 26 so that linear movement of the pitch control rod 24 along the longitudinal axis 28 of the pitch control rod 24 changes the pitch of at least one tail rotor blade (not shown). The details of how the pitch control rod 24 may control the blade pitch is not described here, but will be understood by the skilled person. The coupling of the pitch control rod 24 to the tail rotor 22 via the duplex bearing 26 means that, if the duplex bearing 26 seizes or otherwise fails, the amount of torque transferred from the tail rotor 22 to the pitch control rod 24 and the actuator 20 will increase.

The actuator 20 comprises an input lever 30 for applying a force to the pitch control rod 24 to produce linear movement of the pitch control rod 24. The force may be applied by rotation of the input lever 30, and the actuation of the input lever 30 may be controlled by an action by a pilot of the rotorcraft, such as the depression of a pedal in the cockpit. The input lever 30 comprises arms 32 which are coupled to the actuator 20 by a trunnion-style joint 34.

Figure 3:
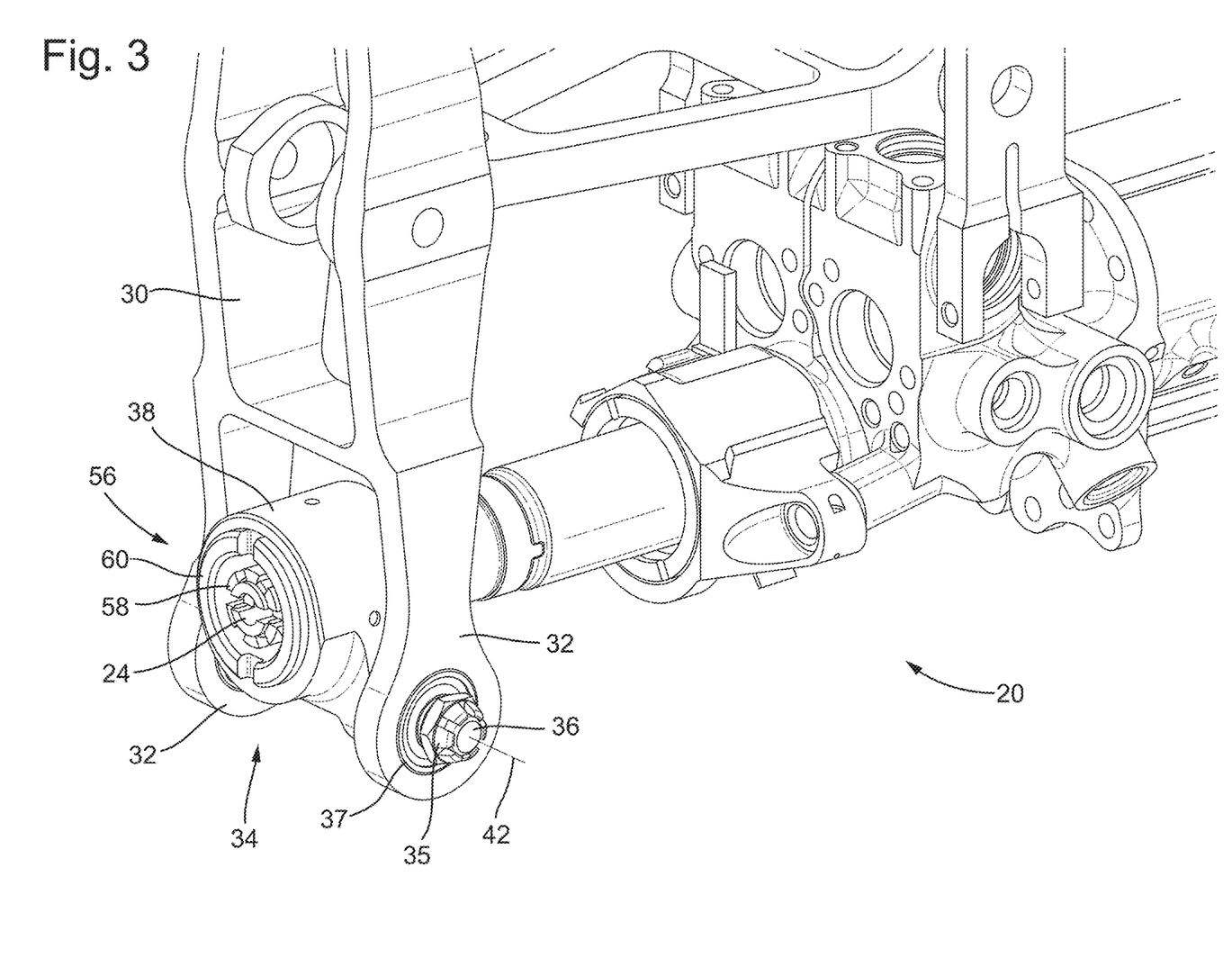
FIG. 3 shows a closer perspective view of the tail rotor actuator of FIG. 2.
Figure 4:
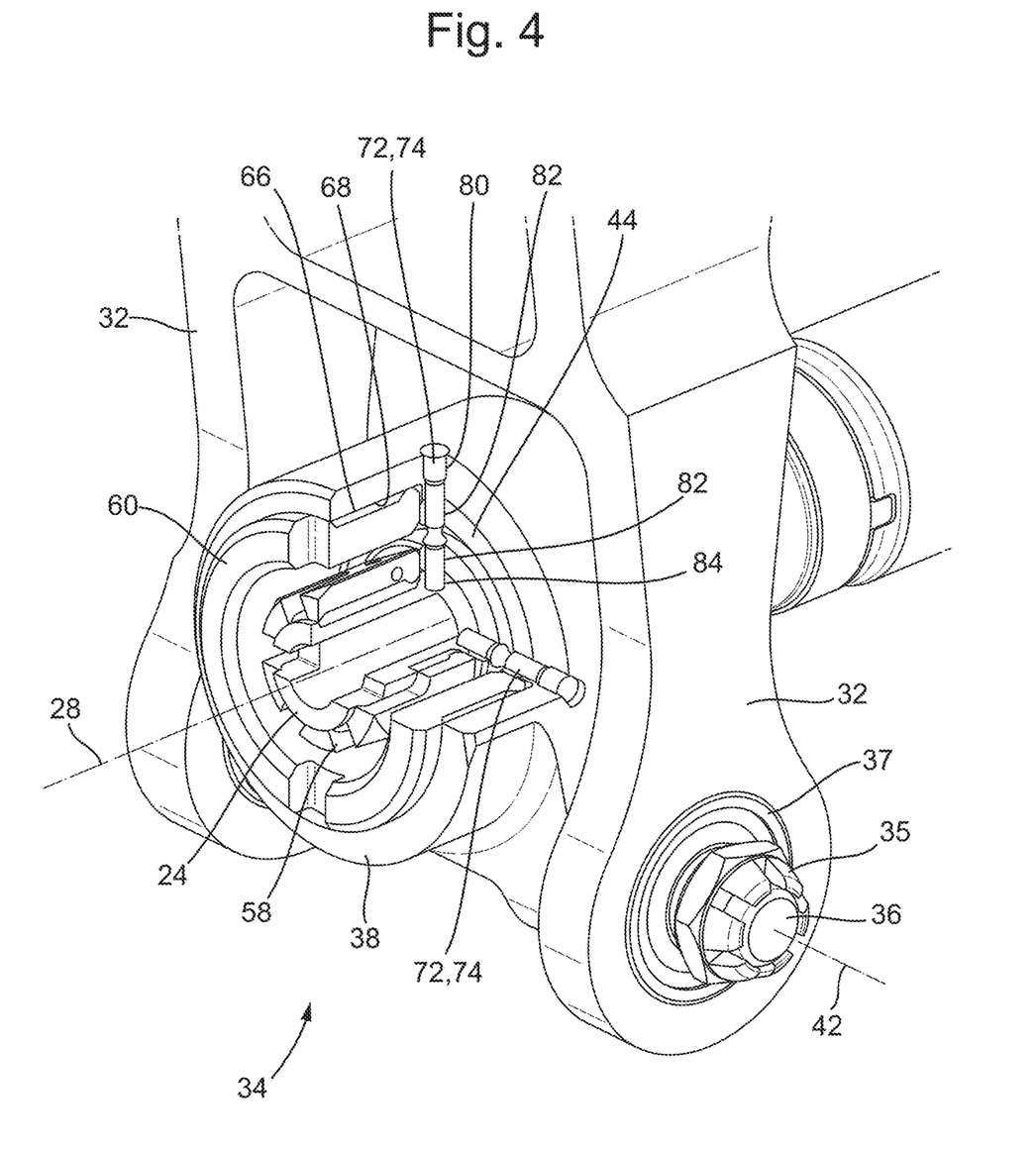
FIG. 4 shows a cutaway view of a joint for the tail rotor actuator of FIG. 2 in accordance with an embodiment of the present disclosure.
Figure 5:
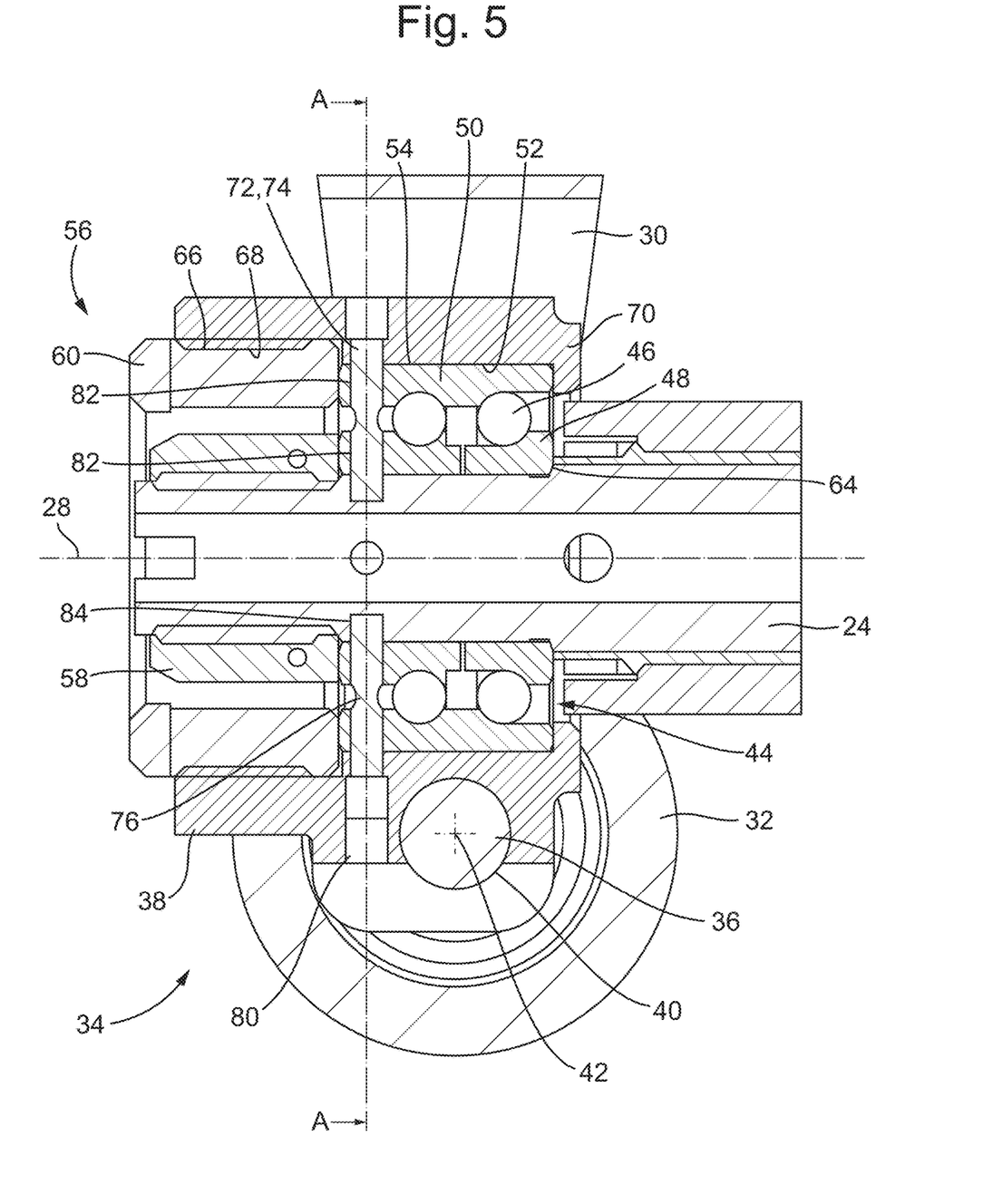
FIG. 5 shows a cross-sectional view of the joint of FIG. 4.

Referring to FIGS. 3, 4 and 5, a shaft 36 extends between the distal ends of the arms 32 of the input lever 30 for coupling the input lever 30 to the joint 34. The joint 34 comprises a housing 38 with a bore 40 that receives the shaft 36 of the input lever 30. The bore 40 extends generally perpendicularly to the control rod axis 28. The input lever 30 can pivot about the coinciding longitudinal axes 42 of the shaft 36 and the bore 40. The arms 32 are fastened on the shaft 36 by nuts 35, and may comprise a rotary bearing 37 to facilitate the rotational movement of the input lever 30 about the shaft 36, as shown in FIG. 6.

When the input lever 30 is rotated about the axes 42, the ability of the input lever 30 to pivot at the housing 38 enables the rotational motion of the input lever 30 to be translated into a linear pulling or pushing force on the pitch control rod 24 along its axis 28.

Figure 6:
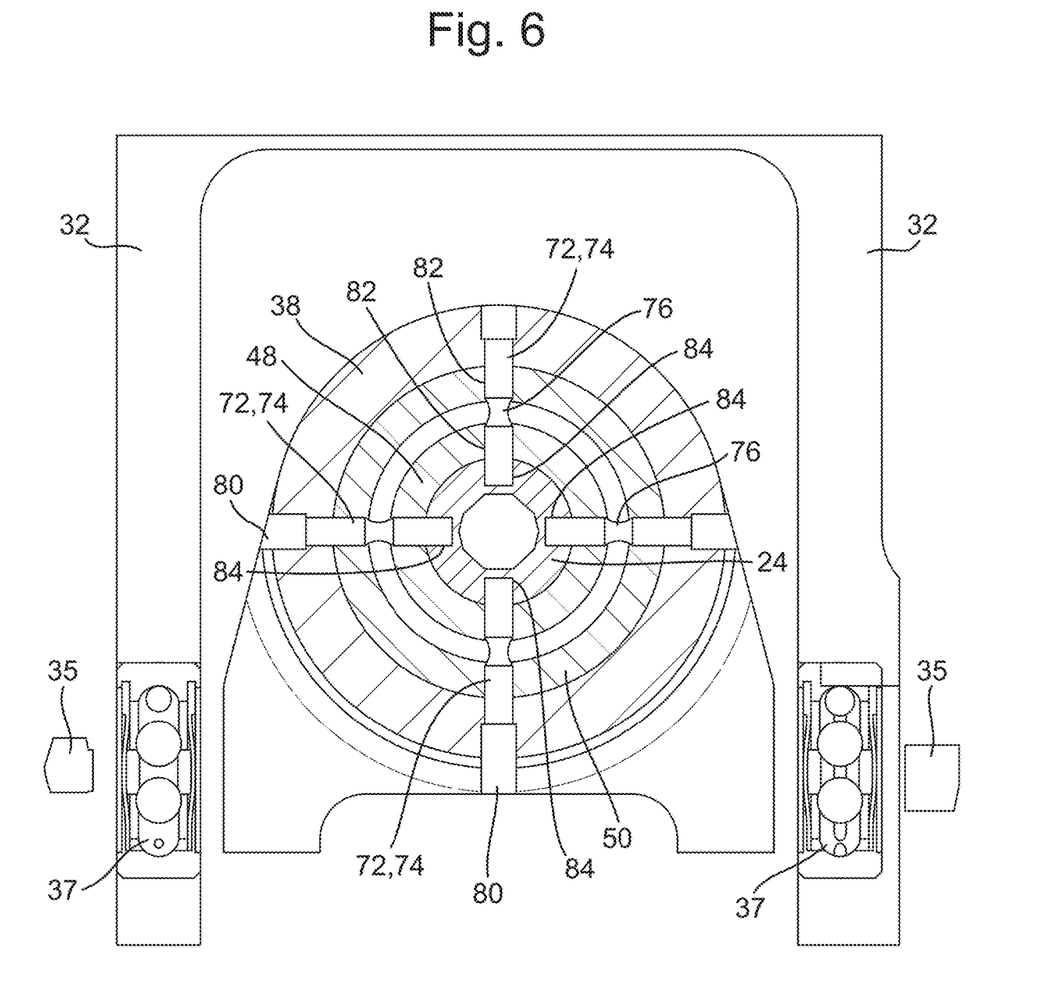
FIG. 6 shows another cross-sectional view of the joint, taken along line A-A of FIG. 5.
Figure 7:
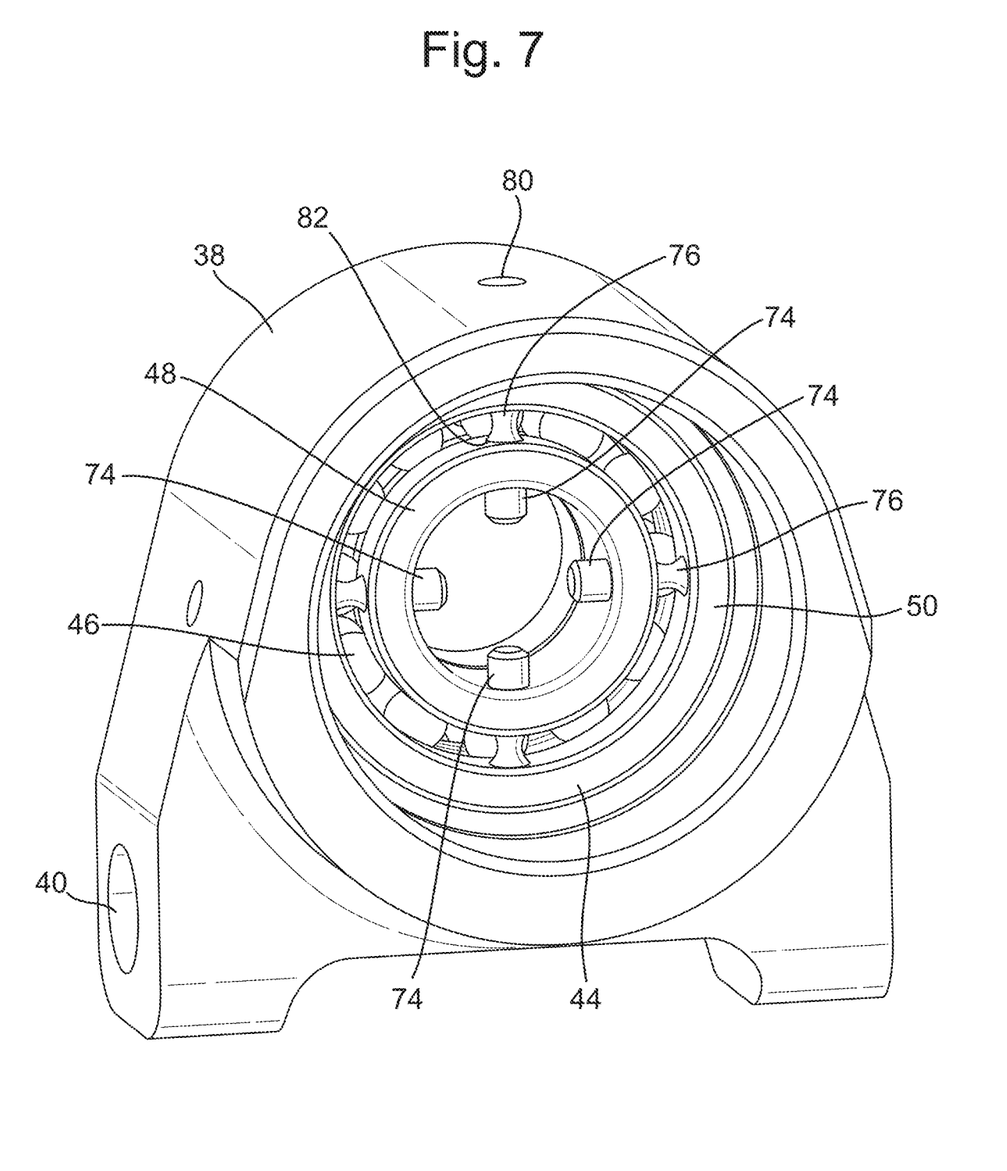
FIG. 7 shows a perspective view of part of the joint of FIG. 4.

As shown in FIGS. 4, 5 and 6, the housing 38 is arranged concentrically about the pitch control rod 24, and the joint 34 further comprises a rotary bearing 44 arranged within the housing 38 and concentrically about the pitch control rod 24. The bearing comprises rolling elements 46 held between an inner race 48 and an outer race 50. The inner race 48 is mounted to an outer surface of the pitch control rod 24. FIG. 7 shows the rotary bearing 44 arranged within the housing 38 without the pitch control rod 24.

In other examples, the rotary bearing 44 is arranged inside the pitch control rod 24 such that the outer race 50 is mounted to an inner surface of the pitch control rod 24.

Referring to FIG. 5, the housing 38 comprises an inner axially extending surface 52 which abuts an outer axially extending surface 54 of the outer race 50 such that the rotary bearing 44 is held in place radially with respect to the axis 28 by the housing 38. The rotary bearing 44 may be any suitable type of ball bearing or a roller bearing.

The bearing 44 is held in place axially with respect to the housing 38 and pitch control rod 24 by a fastening system 56. In this embodiment, the fastening system 56 comprises two nuts 58, 60. The first nut 58 is coupled to the end of the pitch control rod 24, for example by a threaded connection, and is configured to axially secure the bearing inner race 48 with respect to the pitch control rod 24. The pitch control rod 24 may comprise a lip 64 with a radially extending surface against which the inner race 48 abuts, such that the inner race 48 is axially restrained between the first nut 58 and the lip 64.

The second nut 60 is mounted to the housing 38 concentrically about the first nut 58 and pitch control rod 24 and is configured to axially secure the outer race 50 with respect to the housing 38 and pitch control rod 24. The outer axially extending surface 66 of the second nut 60 is mounted to an inner axially extending surface 68 of the housing 38. For example, the surfaces 66, 68 may be threaded to engage with each other by a threaded connection. The housing 38 may comprise a radially extending flange 70 with a radially extending surface against which the outer race 50 abuts, such that the outer race 50 is axially restrained between the flange and the second nut 60. The flange 70 may be an annular flange 70.

The nuts 58, 60 may be secured to the joint 34 by locking devices, such as locking wire or cotter pins (not shown).

It will be understood that within the scope of this disclosure other suitable fastening systems may be used to secure the joint 34 to the pitch control rod 24.

With reference to FIGS. 4 to 7, the joint 34 also comprises at least one shearing element 72 to prevent relative rotation of the inner and outer bearing races 48, 50 about the axis 28 until a predetermined minimum amount of torque is transferred to the joint 34 from the pitch control rod 24, for example via the shearing element 72.

The number and type of shearing elements 72 used may depend on the strength of each shearing element 72, for example due to the material and/or dimensions of the shearing element 72, and the torque resistance requirements of the joint 34. The at least one shearing element 72 may be provided as one or more separate components, as in the embodiment described below, or may be in the form of an integral section of at least one of the rotary bearing 44, pitch control rod 24 or housing 38. The at least one shearing element 72 may comprise a combination of separate components and integral sections.

The shearing element 72 is designed to break under the application of a predetermined minimum torque transferred to the joint 34 from the pitch control rod 24. The shearing element 72 is arranged within the joint 34 so that once the shearing element 72 is broken the inner race 48 of the bearing 44 is free to rotate with the pitch control rod 24, and relative to the outer race 50. This prevents further transfer of torque to the actuator 20 beyond the bearing to the housing 38, which in turn protects the joint 34 from breaking due to the high torque. If the bearing 44 is arranged inside the pitch control rod 24, then once the shearing element 72 is broken the outer race would be free to rotate with the pitch control rod 24, and relative to the inner race 48.

The shearing element 72 may connect the housing 38, outer race 50, inner race 48 and control rod 24 and be configured to break between the outer race 50 and inner race 48. The housing 38 and outer race 50 may then remain rotationally fixed to each other, and the inner race 48 and control rod 24 may remain rotationally fixed to each other, but be able to rotate with respect to the housing 38 and outer race 50.

In this embodiment the at least one shearing element 72 comprises shear pins 74 coupling the housing 38 to the pitch control rod 24 via the bearing 44, and rotationally fixing the inner race 48 relative to the outer race 50. FIGS. 4 to 7 show that each shear pin 74 extends through a through-hole 80 in the housing 38 and corresponding through-holes 82 in the bearing races 48, 50. The radially inner end of each shear pin 74 is received by a blind hole 84 in the pitch control rod 24. Four shear pins 74 are shown in FIGS. 6 and 7, but it will be understood that within the scope of this disclosure the number of shear pins 74 may be less than or greater than four.

Each shear pin 74 in this embodiment comprises circular cross-section with a narrowed waist 76 at which the shear pin 74 is designed to break under the application of a predetermined minimum torque that is transferred to the shear pin 74 through the pitch control rod 24 from the tail rotor 22. The shearing elements 72 may be designed to break under the application of a torque in the range of 150 Nm to 500 Nm, or more narrowly in the range of 200 Nm to 300 Nm, for example 230 Nm.

It will be understood that the shear pins 74 are not limited to this particular design, and may have other shearing features in other embodiments within the scope of this disclosure. For example, the shear pins 74 may have other cross-sectional shapes, such as a rectangular cross-section, with a specific shearing zone that breaks if the torque exceeds a limit. The shear pins 74 may not have narrowed waists, but may have a uniform shape, such as a rod, comprising a diameter and/or material chosen to provide specific shearing properties.

Once the shear pins 74 have broken under the application of the minimum torque from the pitch control rod 24, the pitch control rod 24 and inner bearing race 48 are free to rotate under the applied torque from the tail rotor 22. In this embodiment, the first nut 58 of the fastening system 56 will also rotate with the pitch control rod 24 relative to the outer race 50, second nut 60 and housing 38.

Though the pitch control rod 24 is free to rotate, the actuation connection between the input lever 30 and pitch control rod 24 is maintained via the bearing 44 and housing 38 so that the input lever 30 can still impart a linear force to the pitch control rod 24 to control the tail rotor blade pitch.

Therefore, if the duplex bearing 26 at the tail rotor 22 fails so that the torque on the pitch control rod 24 is increased and transferred to the joint 34, the shear pins 74 will break to protect the joint 34 by allowing the inner bearing race 48 to rotate with the pitch control rod 24, but the input lever 30 will still be able to control the linear movement of the pitch control rod 24.

Accordingly, the pilot can maintain control of the tail rotor blade pitch and the helicopter yaw angle even when the duplex bearing 26 has failed, and a high torque is transferred from the tail rotor 22 through the pitch control rod 24 to the tail rotor actuator 20. This is in contrast to conventional tail rotor actuators, in which the joint, such as the joint 1 in FIG. 1 between the input lever 2 and pitch control rod 4 would break under the increased torque. In these situations, the actuation connection between the input lever 2 and the pitch control rod 4 would be lost, leading in turn to the complete loss of yaw control of the rotorcraft.

The torque tolerance by the present tail rotor actuator 20 avoids a critical failure of the helicopter and maintains yaw control to give the pilot sufficient time to make an emergency landing.

Figure 8:
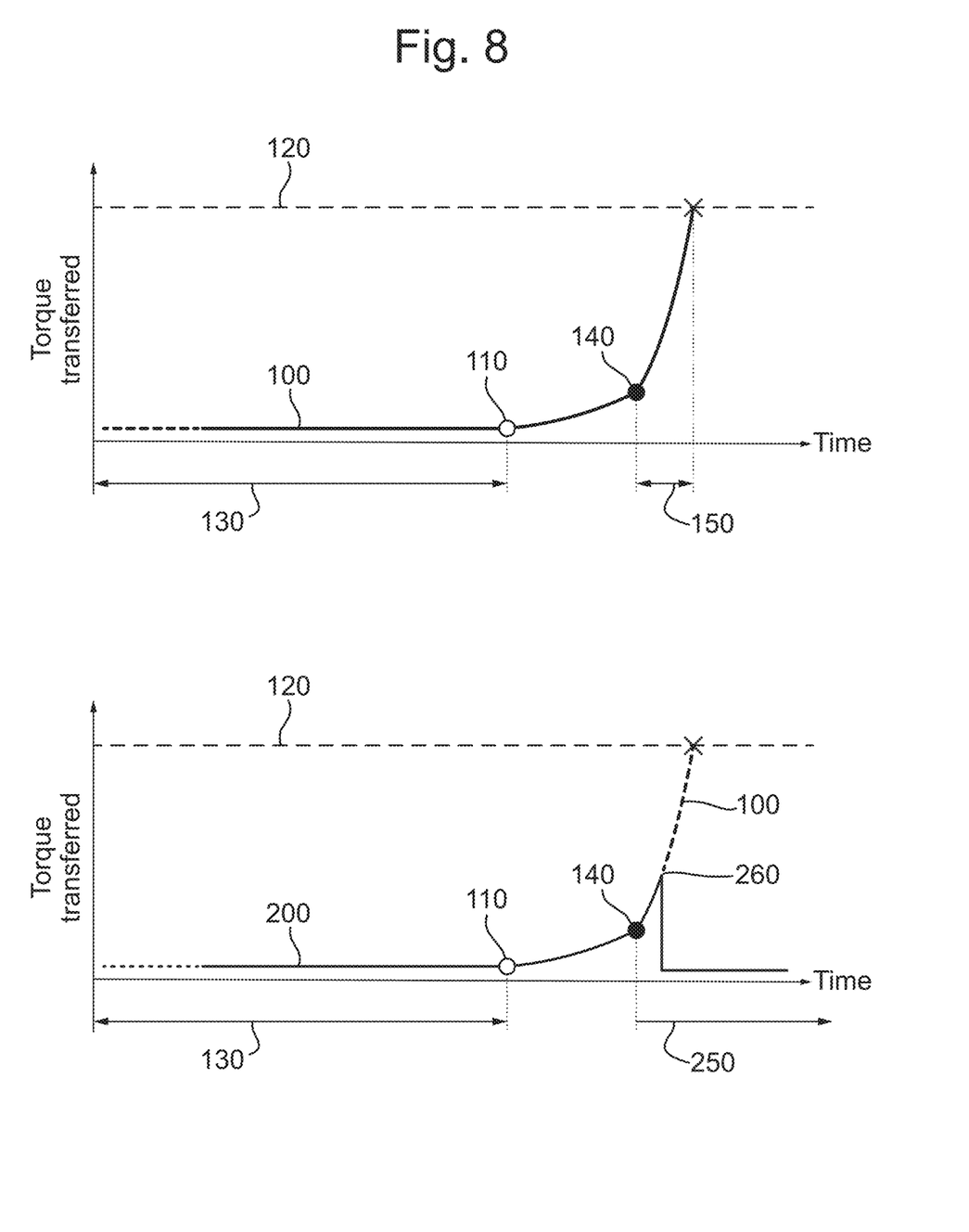
FIG. 8 shows graphs illustrating the effect of torque transfer to the tail rotor actuator with time for a conventional joint and for the joint of FIG. 4.

The increased time 250 available to make an emergency landing that is provided by the torque tolerant tail rotor 22 actuator of the present disclosure is demonstrated by the graphs 100, 200 in FIG. 8. The first graph 100 demonstrates how the amount of torque transferred from the tail rotor to a conventional actuator joint, such as the conventional joint 1 shown in FIG. 1 changes with time when the duplex bearing 26 seizes 110. The second graph 200 demonstrates for the presently disclosed torque tolerant actuator 20 how the amount of torque transferred from the tail rotor 22 to the joint housing 38 changes with time when the duplex bearing 26 seizes. The horizontal dotted line 120 on each graph 100, 200 shows the limit of the strength of the conventional actuator joint 1 and the amount of torque that will cause the conventional joint 1 to break, leading to the loss of yaw control.

During normal operation 130, the amount of transferred torque remains at a low level that the pitch control rod 4, 24 and joint 1, 34 are designed to withstand, for example around 80 Nm. Upon duplex bearing seizure 110, the transferred torque starts to increase and an alert 140 may be issued to the pilot. Once the alert 140 has been issued, for example when the torque has increased to around 170 Nm, the pilot can start to make an emergency landing. With the conventional actuator joint 1, the transferred torque continues to increase and, as demonstrated in FIG. 8, may start to increase at higher rates. The pilot therefore only has the time 150 between the alert being issued and the transferred torque reaching the conventional actuator's strength limit 120 to make an emergency landing.

With the actuator 20 and joint 34 of the present disclosure, the torque transferred to the housing 38 only increases to the maximum torque threshold 260 set by the shearing elements 72, for example a maximum torque in the range of 150 Nm to 500 Nm, or more narrowly in the range of 200 Nm to 300 Nm, for example 230 Nm. Once this threshold 260 has been reached, the shearing elements 72 break to allow the pitch control rod 24 and the inner race 48 of the bearing 44 to rotate under the excess torque transferred from the tail rotor 22 to the joint 34, instead of this excess torque being transferred to the housing 38 (where it could break the connection to the input lever 30). The graph shows that this excess torque transferred to the housing 38 is then eliminated so that amount of transferred torque fall to below the low level during normal operation 130. When the joint 34 permits rotation, the transferred torque will be the passive torque of the duplex bearing 26, which may be about ⅓ Nm.

In this way, the actuation connection provided by the joint 34 between the input lever 30 and the pitch control rod 24 is protected and the failure of the duplex bearing 26 cannot result in the loss of this connection and the loss of control over the blade pitch angle. The pilot then has a longer amount of time 250 available for making an emergency landing.

Once the rotorcraft has landed, the duplex bearing 26 can be repaired or replaced, and the joint 34 can be replaced or reset, for example by replacing the broken shearing elements 72 with new, unbroken shearing elements 72.

Although certain advantages have been discussed in relation to certain features above, other advantages of certain features may become apparent to the skilled person following the present disclosure.

The invention claimed is:

1. A actuator for a rotorcraft, the actuator comprising:
   a joint and a control rod, wherein the control rod is a control rod for a tail rotor and is coupled to the joint such that a torque applied to the control rod is transferred to the joint;
   wherein the control rod is rotationally fixed relative to the joint until the torque applied to the joint via the control rod exceeds a threshold torque value;
   the joint comprising:
   a housing configured to be coupled to an input lever of the actuator; and
   a rotary bearing coupled to the housing, the rotary bearing comprising:
   an inner race; and
   an outer race;
   wherein the bearing is coupled to the control rod;
   at least one shearing element coupled to the rotary bearing to rotationally fix the inner race and outer race relative to each other, wherein the at least one shearing element is configured to break when a torque applied to the joint exceeds the threshold torque value such that there is a relative rotatability between the inner race and the outer race and the control rod becomes rotatable with the inner race and/or outer race due to their relative rotatability.

2. The actuator of claim 1, wherein the at least one shearing element is a shear pin comprising a narrowed waist, wherein the shear pin is configured to break at the narrowed waist when a torque applied to the joint exceeds the threshold torque value.

3. The actuator of claim 1, wherein the at least one shearing element extends through the inner race, the outer race and the housing, and is configured to break in an area located between the inner race and the outer race.

4. The actuator of claim 1, wherein the outer race is coupled to the housing, and the inner race is configured to be coupled to a control rod, wherein the relative rotatability between the inner race and the outer race is provided by the inner race being rotatable with respect to the outer race.

5. The actuator of claim 1, further comprising a fastening system for fastening the joint to the control rod.

6. The actuator of claim 1, wherein the at least one shearing element couples the housing to the rotary bearing and the control rod.

7. The actuator of claim 1, wherein the joint is fastened to the control rod by a fastening system, the fastening system comprising:
   a first nut and a second nut, wherein axial movement of the housing and outer race with respect to a longitudinal axis of the control rod is restrained by the second nut, and axial movement of the inner race is restrained by the first nut.

8. The actuator of claim 7 wherein, when a torque applied to the joint exceeds the threshold torque value, the inner race and the first nut are rotatable relative to the outer race, housing and the second nut.

9. The actuator of claim 1, further comprising an input lever coupled to the housing for applying a force to the control rod via the housing, causing linear movement of the control rod.

10. A rotorcraft comprising:
    a tail rotor; and
    the actuator of claim 1, wherein the control rod is coupled to the tail rotor and configured to control a blade pitch of the tail rotor.

11. A method of operating a tail rotor of a rotorcraft, wherein the tail rotor is coupled to a first end of a control rod, and a second end of the control rod is coupled by a joint to an input lever, the joint comprising a housing coupled to the input lever and a rotary bearing coupled between the housing and the control rod, the method comprising:
    receiving a torque at the joint, the torque transferred from the tail rotor to the joint by the control rod;
    maintaining the housing, rotary bearing and control rod rotationally fixed relative to a longitudinal axis through the control rod while the torque received at the joint remains below a threshold value;
    once the torque received at the joint exceeds the threshold value, allowing the control rod and an inner race of the rotary bearing to rotate about the longitudinal axis relative to the housing and an outer race of the rotary bearing such that the torque transferred to the housing decreases below the threshold value;

wherein the housing, rotary bearing and control rod are maintained rotationally fixed relative to the longitudinal axis by at least one shearing element that is configured to break once the torque received at the joint exceeds the threshold value, so as to allow the control rod and the inner race of the rotary bearing to rotate about the longitudinal axis.

* * * * *